(12) United States Patent
Kelly et al.

(10) Patent No.: US 9,574,500 B2
(45) Date of Patent: Feb. 21, 2017

(54) DIRECT METERING USING A VARIABLE DISPLACEMENT VANE PUMP

(71) Applicant: General Electric Company, Schenectady, NY (US)

(72) Inventors: Lauren Marie Kelly, Scituate, MA (US); Robert Edward Goeller, Beverly, MA (US); William James Mailander, Beverly, MA (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 14/595,591

(22) Filed: Jan. 13, 2015

(65) Prior Publication Data

US 2016/0201574 A1    Jul. 14, 2016

Related U.S. Application Data

(60) Provisional application No. 61/946,048, filed on Feb. 28, 2014.

(51) Int. Cl.
*F02C 9/30* (2006.01)
*F02C 7/232* (2006.01)
*F02C 7/236* (2006.01)
*F02C 9/26* (2006.01)

(52) U.S. Cl.
CPC .............. *F02C 9/30* (2013.01); *F02C 7/232* (2013.01); *F02C 7/236* (2013.01); *F02C 9/26* (2013.01); *F02C 9/263* (2013.01)

(58) Field of Classification Search
CPC ............... F02C 9/26; F02C 9/263; F02C 9/30; F02C 7/232; F02C 7/236
See application file for complete search history.

(56) References Cited

U.S. PATENT DOCUMENTS

| | | | | |
|---|---|---|---|---|
| 3,332,234 | A * | 7/1967 | Lavash | F02C 7/236 60/39.281 |
| 6,487,847 | B1 * | 12/2002 | Snow | F02C 7/236 60/235 |
| 8,256,222 | B2 | 9/2012 | Mahoney | |

(Continued)

FOREIGN PATENT DOCUMENTS

| | | |
|---|---|---|
| CN | 102575586 A | 7/2012 |
| CN | 102926876 A | 2/2013 |

(Continued)

OTHER PUBLICATIONS

Unofficial English Translation of Chinese Office Action issued in connection with corresponding CN Application No. 201510089442.2 on Jul. 19, 2016.

(Continued)

*Primary Examiner* — Steven Sutherland
(74) *Attorney, Agent, or Firm* — General Electric Company; Pamela A. Kachur

(57) ABSTRACT

A direct metering architecture is provided having a metering pump and a servo pump wherein the metering and servo pumps are driven by an engine shaft by way of a gearbox transmission. The system reduces wasted horsepower previously occurring with oversized fixed displacement pumps, reduces instances of engine flameout and reduces the amount of heat added to fuel which ultimately improves engine oil cooling.

4 Claims, 2 Drawing Sheets

(56) References Cited

U.S. PATENT DOCUMENTS

| | | | |
|---|---|---|---|
| 8,291,886 B2 | 10/2012 | Mahoney | |
| 8,302,406 B2* | 11/2012 | Baker | F02C 7/236 |
| | | | 137/563 |
| 2003/0074884 A1 | 4/2003 | Snow et al. | |
| 2011/0289925 A1* | 12/2011 | Dyer | F02C 7/232 |
| | | | 60/734 |
| 2012/0045348 A1 | 2/2012 | Garry | |
| 2012/0266600 A1 | 10/2012 | Bader et al. | |

FOREIGN PATENT DOCUMENTS

| | | |
|---|---|---|
| EP | 0474585 A1 | 3/1992 |
| EP | 1819914 A2 | 8/2007 |
| EP | 2485109 A2 | 8/2012 |
| EP | 2088302 B1 | 7/2013 |
| WO | 2007044020 A2 | 4/2007 |

OTHER PUBLICATIONS

European Search Report and Opinion issued in connection with corresponding EP Application No. 15156629.6 on Jul. 16, 2015.

* cited by examiner

DIRECT METERING USING A VARIABLE DISPLACEMENT VANE PUMP

CROSS-REFERENCE TO RELATED DOCUMENTS

This Non-Provisional utility application claims priority to and benefit from under 35 U.S.C. §119(c) provisional application having U.S. Patent Application Ser. No. 61/946,048, titled "Direct Metering Using a Variable Displacement Vane Pump" and having filing date Feb. 28, 2014, all of which is incorporated by reference herein.

TECHNICAL FIELD

Present embodiments relate generally to gas turbine engines. More particularly, present embodiments relate, but are not limited, to a direct metering architecture for a gas turbine engine.

BACKGROUND

A typical gas turbine engine generally possesses a forward end and an aft end with its several core or propulsion components positioned axially therebetween. An air inlet or intake is at a forward end of the gas turbine engine. Moving toward the aft end, in order, the air intake is followed by a compressor, a combustion chamber, and a turbine. It will be readily apparent from those skilled in the art that additional components may also be included in the gas turbine engine, such as, for example, low pressure and high pressure compressors, and high pressure and low pressure turbines. This, however, is not an exhaustive list. A gas turbine engine also typically has an internal shaft axially disposed along a center longitudinal axis of the gas turbine engine. The internal shaft is connected to both the turbine and the air compressor, such that the turbine provides a rotational input to the air compressor to drive the compressor blades.

In operation, air is pressurized in the compressor and mixed with fuel in a combustor for generating hot combustion gases which flow downstream through turbine stages. These turbine stages extract gas energy from the combustion gases and converts such to mechanical energy. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk.

In order to deliver fuel to the gas turbine engine, a single pump is generally utilized which pumps fuel for fuel burn, a fuel burn flow, and pumps fuel for valve actuation, a servo flow, and pumps fuel for mechanical actuation of external devices such as valves and stator positions, an actuation flow. These pumps are normally a fixed displacement type pump. However, the downside of a single pump, is that it generally wastes horsepower since such pump is sized to provide a higher flow than generally necessary. Additionally, the fuel may pass through a by-pass circuit which increases heat of the fuel and reduces the ability of the fuel to absorb other heat sources within the gas turbine engine.

With regard to the servo flow, it is not uncommon that valves and actuators become stuck in one position. When the valve changes to an unstuck position, this creates a high demand of fuel. In the instance where a single fixed displacement pump is utilized for both fuel burn flow and servo flow, the high demand may pull large amounts of fuel burn flow from the combustor, causing a flame-out of the engine.

As may be seen by the foregoing, it would be desirable to reduce the waste horsepower of the engine and it would be further desirable to reduce the heat increase of the fuel. Additionally, it would be highly desirable to reduce or eliminate the instances of flameout of the engine.

SUMMARY

A direct metering architecture is provided having a metering pump and a servo pump wherein the metering and servo pumps are driven by an engine shaft by way of a gearbox transmission. The system reduces waste horsepower previously occurring with oversized fixed displacement pumps, reduces instances of engine flameout and reduces the amount of heat added to fuel which ultimately improves engine oil cooling.

According to some embodiments, a gas turbine engine fuel supply system with direct metering architecture comprises an engine power takeoff shaft providing a mechanical power input to a gearbox, the gearbox providing at least one driving output to a variable displacement metering pump and a servo pump. The variable displacement metering pump is set to meter an engine burn flow of fuel for engine burn, and the servo pump providing a servo flow of fuel necessary for actuation of at least one of a valve or actuator. The servo flow of fuel and said engine burn flow of fuel are isolated from each other and interactions between the servo flow of fuel and said engine burn flow of fuel are reduced.

According to some embodiments, a direct metering architecture for fuel supply to a gas turbine engine comprises a servo flow circuit comprises a fixed displacement servo pump driven by an engine take-off shaft which is coupled to a gearbox. The servo pump may be in flow communication with a servo, the servo operably connected to a variable displacement metering pump actuator, the servo flow circuit further comprising at least one return line. An engine burn flow circuit comprises a variable displacement metering pump which is operably connected to the variable displacement metering pump actuator. An output line for metered burn flow and at least one return line.

According to still further embodiments, a direct metering architecture for a gas turbine engine fuel supply system comprises an engine power takeoff shaft provides a mechanical power input to a transmission, the transmission provides at least one driving output to a variable displacement metering pump and a servo pump. An engine burn flow circuit has the variable displacement metering pump metering an engine burn flow of fuel for engine burn. A servo flow circuit has the servo pump providing a servo flow of fuel for actuation of said variable displacement metering pump. The servo flow of fuel and the engine burn flow of fuel are isolated from each other and interactions between the servo flow of fuel and the engine burn flow of fuel are reduced.

All of the above outlined features are to be understood as exemplary only and many more features and objectives of the structures and methods may be gleaned from the disclosure herein. Therefore, no limiting interpretation of the summary is to be understood without further reading of the entire specification, claims and drawings included herewith.

BRIEF DESCRIPTION OF THE ILLUSTRATIONS

The above-mentioned and other features and advantages of these embodiments, and the manner of attaining them, will become more apparent and the embodiments will be better understood by reference to the following description taken in conjunction with the accompanying drawings, wherein.

DETAILED DESCRIPTION

Figure 1:
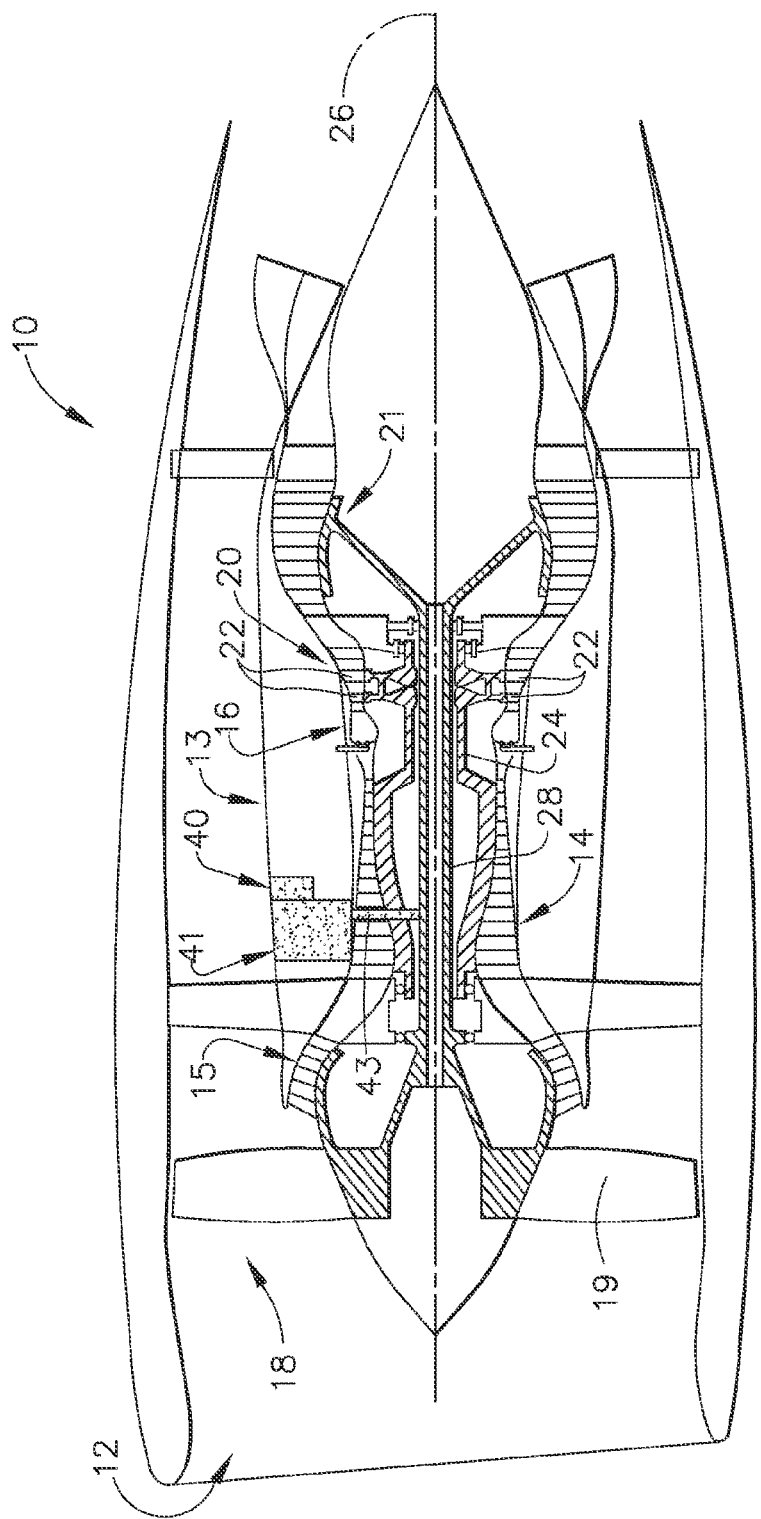
FIG. 1 is a side section view of an exemplary gas turbine engine.

It is to be understood that the embodiments are not limited in application to the details of construction and the arrangement of components set forth in the following description or illustrated in the drawings. The embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus it is intended that the present disclosure covers such modifications and variations as come within the scope of the appended claims and their equivalents.

Figure 2:
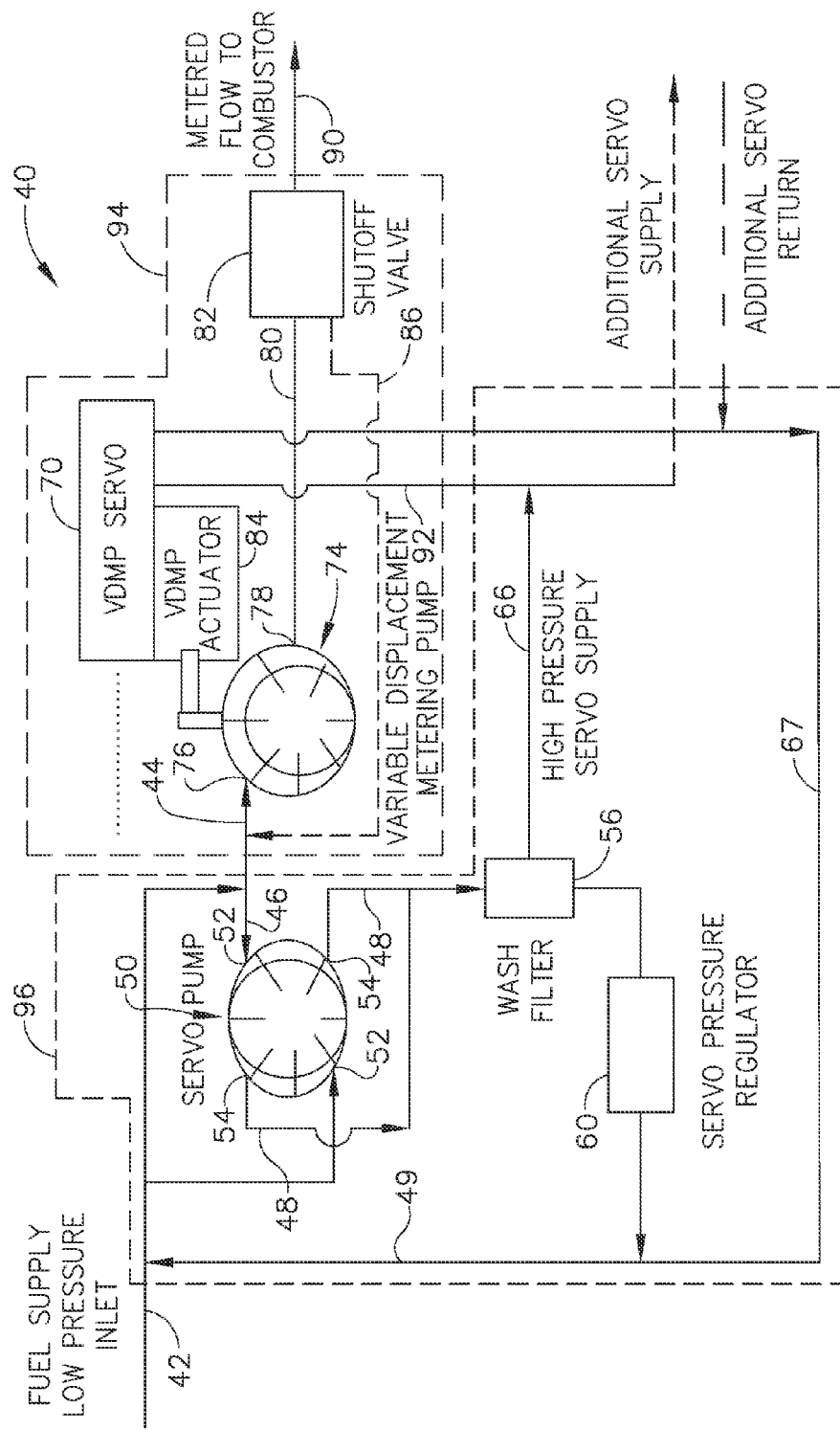
FIG. 2 is a schematic view of the direct metering architecture for the exemplary gas turbine engine.

Referring to FIGS. 1-2, a direct metering architecture for fuel flow is depicted. The architecture utilizes a single metering pump and a separate servo pump both of which are mechanically coupled to an engine shaft for operation. The distinct pumps allow for improved pump sizing for the metering pump which reduces wasted horsepower and the separate servo pump allows for reduction of fuel burn flow interactions due to operating conditions of the valves serviced by the servo pump.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of a gas turbine engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rearward (aft) end of the engine.

As used herein, the terms "radial" or "radially" refer to a dimension extending between a center longitudinal axis of the engine and an outer engine circumference.

Referring initially to FIG. 1, a schematic side section view of a gas turbine engine 10 is shown having a gas turbine engine inlet end 12 wherein air enters the core propulsor 13 which is defined generally by a high pressure compressor 14, a combustor 16 and a multi-stage high pressure turbine 20. Collectively, the core propulsor 13 provides power during operation. The gas turbine engine 10 may be used for aviation, power generation, industrial, marine or the like.

In operation, air enters through the engine inlet end 12 of the gas turbine engine 10 and moves through at least one stage of compression at high pressure compressor 14 where the air pressure is increased and directed to the combustor 16. The compressed air is mixed with fuel and burned providing the hot combustion gas which exits the combustor 16 toward the high pressure turbine 20. At the high pressure turbine 20, work is extracted from the hot combustion gas by way of rotation of high pressure turbine blades 22 which in turn cause rotation of a high pressure shaft 24 about engine axis 26. The high pressure shaft 24 passes toward the front of the gas turbine engine to continue rotation of the one or more stages of the high pressure compressor 14, a fan 18 having inlet fan blades 19, depending on the turbine design. The fan 18 is operably connected to a low pressure turbine 21 and creates thrust for the gas turbine engine 10. The operable connection may be direct or indirect, such as by a transmission or gear box. The low pressure turbine 21 may also be utilized to extract further energy and power stages of a low pressure compressor 15 also referred to as a booster and the fan 18 or a turboshaft or turboprop to power rotors or propellers.

The gas turbine engine 10 is axisymmetrical about engine axis 26 or high pressure shaft 24 so that various engine components rotate thereabout. The axisymmetrical high pressure shaft 24 extends through the gas turbine engine 10 forward end into an aft end and is journaled by bearings along the length of the shaft structure. The high pressure shaft 24 rotates about the centerline 26 of the engine 10. The high pressure shaft 24 may be hollow to allow rotation of one or more low pressure shafts 28 therein and independent of the high pressure shaft 24 rotation. The low pressure shaft 28 also may rotate about the engine axis 26 and may rotate in the same or different direction than the high pressure shaft 24. During operation, the low pressure shaft 28 rotates along with other structures connected to the low pressure shaft 28 such as the rotor assemblies of the turbine in order to operate the low pressure compressor 15 and fan 18 to create thrust or power used in aviation power and industrial areas.

Also shown schematically in FIG. 1 is the direct fuel metering architecture control unit 40. An engine gearbox 41 receives power from an engine shaft, for example one of shafts 24, 28. The engine gearbox 41 receives an input from a power take off shaft 43. The engine gearbox 41 powers the direct fuel metering architecture control unit 40 which is described further herein.

Referring now to FIG. 2, a schematic view of the direct fuel metering architecture control unit 40 is depicted. The direct fuel metering architecture control unit 40 provides burn flow fuel to the combustor 16. A fuel feed line 42 is shown entering the direct fuel metering architecture control unit 40 which originates from a fuel reservoir. The fuel feed line 42 splits into a metering pump feed 44 and a servo pump feed 46. As previously described, the metering architecture provides two flow circuits which are independent and therefore do not affect one another. The metering and servo pump feeds 44, 46 provide fuel supply for two circuits, the engine burn flow circuit 94 and the servo flow circuit 96.

Referring first to the servo pump 50, the servo pump feed 46 enters the servo pump 50 at at least one location. The servo pump 50 may be a mechanically driven fixed displacement pump. The servo pump 50 may be a balanced or unbalanced vane pump and may include one or more inputs 52 and one or more outputs 54. An output line 48 may be in fluid communication with a wash filter 56. The servo pump 50 may include multiple output lines 48 extending from the servo pump 50. The wash filter 56 removes minute contaminants which would otherwise pass to one or more servos and could potentially contaminate the servo hindering operation.

Further in fluid communication with the wash filter 56 is a pressure regulator 60. The pressure regulator 60 is set to a desired operating pressure and regulates the pressure upstream of the pressure regulator 60 including a servo feed line 66 to a variable displacement metering pump servo 70. The pressure regulator 60 is further in downstream flow communication through servo pump return line 49 to the fuel feed line 42 creating a circuit for fluid flow driven by the servo pump 50.

According to some embodiments the servo pump 50 may be a balanced vane pump, an unbalanced vane pump or a piston pump. Additional alternatives include a gear pump or a rotor pump all of which are fixed displacement type pumps. Further, it should be understood that any of these embodiments may be mechanically driven. For example, such mechanical driving force may be from a gearbox operably connected to the servo pump 50.

The direct fuel metering architecture control unit 40 further comprises a variable displacement metering pump 74 which is also mechanically driven. The variable displacement metering pump 74 may be a balanced vane pump, an unbalanced vane pump or a piston pump. The variable displacement metering pump 74 is a variable displacement pump which is mechanically driven by an engine shaft. More specifically, the variable displacement metering pump 74 is mechanically coupled to an engine shaft, for example shaft 24 or shaft 28 by way of an engine gearbox 41 which drives the variable displacement metering 74 at either a fixed speed or a speed proportional of gas turbine engine 10, for example.

The variable displacement metering pump 74 receives fuel from the metering pump feed 44 and may include one or more fuel inputs 76. Additionally the variable displacement metering pump 74 includes an output 78 to direct fuel through a pump output line 80. The pump output line 80 may be in fluid communication with a shut off valve 82 which directs fuel to the burner nozzles within the combustor 16. The shut off valve 82 may be operated by a solenoid or other actuator. A return line 86 returns engine burn flow 90 from the shut off valve 82 back to the metering pump feed 44 creating the engine burn flow circuit 94 through the variable displacement metering pump 74. The engine burn flow circuit 94 is desirable if the shut off valve 82 is in a closed position so that the variable displacement metering pump 74 does not deadhead.

The servo feed line 66 directs fuel flow to the variable displacement metering pump servo 70. The variable displacement metering pump servo 70 causes movement of a variable displacement metering pump actuator 84, which in turn varies the displacement of the variable displacement metering pump 74 being driven at fixed speed. A fluid return line 67 extends between the variable displacement metering pump servo 70 and the servo pump return line 49 providing the return flow for a servo flow circuit 96, both of which are shown within broken lines merely for illustration. It should be understood that while the servo 70 is shown within the engine burn flow circuit 94, this is merely because the servo 70 is located adjacent to the metering pump 74. Thus the servo 70 is indeed considered to be a portion of the servo flow circuit 96.

The direct fuel metering architecture control unit 40 is designed to receive a signal from a full authority digital engine control (FADEC). The FADEC may remotely control the direct fuel metering architecture control unit 40 or alternatively may provide signal to a local module for local control at the direct fuel metering architecture control unit 40.

The direct fuel metering architecture control unit 40 provides various advantages over prior art systems. First, many alternative designs utilize electronic pump motors and controls. By mechanically driving the pumps 50, 74 electric motors and related controls are eliminated which are a potential failure point for the engine burn flow 90 and servo flow 92. Second, interactions between the servo flow 92 and the engine burn flow 90 are eliminated. As previously indicated, interactions between the servo flow 92 and engine burn flow 90 to the combustors 16 can decrease engine burn flow, resulting in flameout of the gas turbine engine 10. With the independent feed of servo flow 92, a sticking valve or servo does not affect the delivery rate of fuel in the fuel burn flow circuit of the direct fuel metering architecture control unit 40. Third, the use of a single pump for both metering and servo or valve supply gave rise to oversized pumps which wasted horsepower of the engine. With the direct fuel metering architecture control unit 40, the variable displacement metering pump 74 is of a smaller size and therefore results in less wasted horsepower. Finally, the instant embodiments have reduced flow through by-pass circuits and therefore have less heat added to the fuel. This allows for improved cooling of engine oil than if additional heat was added to the fuel.

The foregoing description of several embodiments has been presented for purposes of illustration. It is not intended to be exhaustive or to limiting to the precise steps and/or forms disclosed, and obviously many modifications and variations are possible in light of the above teaching. It is intended that the scope of the embodiments and all equivalents be defined by the claims appended hereto.

The invention claimed is:

1. A direct metering architecture for a gas turbine engine fuel supply system, comprising:
   an engine power takeoff shaft providing a mechanical power input to a transmission;
   said transmission providing at least one driving output to a variable displacement metering pump and a servo pump;
   an engine burn flow circuit having said variable displacement metering pump metering an engine burn flow of fuel for engine burn;
   a servo flow circuit having said servo pump providing a servo flow of fuel for actuation of said variable displacement metering pump;
   wherein said servo flow of fuel and said engine burn flow of fuel are isolated from each other and interactions between said servo flow of fuel and said engine burn flow of fuel are reduced.

2. The direct metering architecture of claim 1 further comprising a pressure regulator in said servo flow circuit.

3. The direct metering architecture of claim 1 further comprising a shutoff valve disposed between said variable displacement metering pump and a combustor.

4. The direct metering architecture of claim 3 further comprising a fuel return extending from said shutoff valve to a servo pump feed line.

* * * * *

UNITED STATES PATENT AND TRADEMARK OFFICE
CERTIFICATE OF CORRECTION

PATENT NO. : 9,574,500 B2
APPLICATION NO. : 14/595591
DATED : February 21, 2017
INVENTOR(S) : Kelly et al.

It is certified that error appears in the above-identified patent and that said Letters Patent is hereby corrected as shown below:

On the Title Page

In Item (56), under "U.S. PATENT DOCUMENTS", in Column 2, Line 3, delete "Snow" and insert -- Snow et al. --, therefor.

In Item (56), under "U.S. PATENT DOCUMENTS", in Column 2, Line 5, delete "Mahoney" and insert -- Mahoney et al. --, therefor.

On Page 2, in Item (56), under "U.S. PATENT DOCUMENTS", in Column 1, Line 1, delete "Mahoney" and insert -- Mahoney et al. --, therefor.

On Page 2, in Item (56), under "U.S. PATENT DOCUMENTS", in Column 1, Line 5, delete "Dyer" and insert -- Dyer et al. --, therefor.

In the Specification

In Column 4, Line 42, delete "example" and insert -- example, --, therefor.

In Column 5, Line 12, delete "embodiments" and insert -- embodiments, --, therefor.

In Column 5, Line 28, delete "example" and insert -- example, --, therefor.

In Column 5, Line 35, delete "Additionally" and insert -- Additionally, --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*